(12) United States Patent
Fortik et al.

(10) Patent No.: US 10,718,251 B2
(45) Date of Patent: Jul. 21, 2020

(54) UTILITY VEHICLE

(71) Applicant: Kawasaki Jukogyo Kabushiki Kaisha, Kobe-shi, Hyogo (JP)

(72) Inventors: Loran Fortik, Wahoo, NE (US); Takuma Nozaki, Lincoln, NE (US)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 105 days.

(21) Appl. No.: 16/033,818

(22) Filed: Jul. 12, 2018

(65) Prior Publication Data

US 2020/0018217 A1 Jan. 16, 2020

(51) Int. Cl.
| | | |
|---|---|---|
| *F01N 13/08* | (2010.01) | |
| *B60K 5/00* | (2006.01) | |
| *F01P 5/04* | (2006.01) | |
| *F01N 13/00* | (2010.01) | |
| *F01P 5/06* | (2006.01) | |
| *F01P 1/10* | (2006.01) | |
| *F01P 1/02* | (2006.01) | |
| *F02B 61/00* | (2006.01) | |

(52) U.S. Cl.
CPC ............... *F01N 13/08* (2013.01); *B60K 5/00* (2013.01); *F01N 13/008* (2013.01); *F01P 1/02* (2013.01); *F01P 1/10* (2013.01); *F01P 5/04* (2013.01); *F01P 5/06* (2013.01); *F02B 61/00* (2013.01); *F01P 2001/023* (2013.01)

(58) Field of Classification Search
CPC . F01N 13/08; F01N 13/008; F01P 1/02; F01P 1/10; F01P 5/04; F01P 5/06; F01P 2001/023; F02B 61/00; B60K 5/00
See application file for complete search history.

(56) References Cited

U.S. PATENT DOCUMENTS

| | | | | |
|---|---|---|---|---|
| 5,606,944 | A * | 3/1997 | Kurihara | F02B 63/02 123/195 HC |
| 2003/0154934 | A1* | 8/2003 | Nakamizo | F01P 1/02 123/41.56 |
| 2015/0276658 | A1* | 10/2015 | Okazaki | G01N 27/4071 204/431 |
| 2016/0185203 | A1* | 6/2016 | Ohshita | B60K 5/1208 180/299 |

* cited by examiner

*Primary Examiner* — Jacob M Amick
*Assistant Examiner* — Charles Brauch

(57) ABSTRACT

A utility vehicle includes: an air-cooled engine; a cooling fan disposed on one side of the engine with respect to a vehicle widthwise direction and configured to supply a cooling air towards a cylinder unit of the engine; an exhaust pipe disposed on the other side of the engine with respect to the vehicle widthwise direction and connected with an exhaust port of the cylinder unit; an oxygen sensor fitted to the exhaust pipe; and a shield configured to prevent muddy water, which is swirled by the cooling fan, from depending on the exhaust pipe.

9 Claims, 7 Drawing Sheets

RIGHT　　　　　　　　　　　　　　　　　　LEFT

UTILITY VEHICLE

BACKGROUND OF THE INVENTION

Field of the Invention

The present invention relates to a utility vehicle (UTV) equipped with an air cooled engine.

Description of Related Art

The utility vehicle referred to above and hereinafter is an all-terrain vehicle, that is also referred to as a four wheel buggy car, and is capable of running on any passage way regardless of geographical land features. The utility vehicles equipped with an air cooled engine as a drive source is known. In those vehicles, a cooling air is introduced by a cooling fan from one side with respect to the vehicle widthwise direction and is subsequently guided through a shroud. The cooling air is, after having cooled a cylinder, supplied towards an exhaust port and an exhaust pipe on the other side with respect to the vehicle widthwise direction.

When running takes place on, for example, a muddy land, the utility vehicle runs while drawing mud and/or water. At this time, it may occur that water sucked by the cooling fan is discharged outwardly together with the cooling air and is then scattered into the exhaust pipe by way of the cylinder, accompanied by lowering the temperature of the exhaust pipe. As a result thereof, exhaust gases within the exhaust pipe is rapidly cooled and water components in the exhaust gases may become solidified water which may be deposited on an element of an oxygen sensor within the exhaust pipe.

SUMMARY OF THE INVENTION

The present invention has for its primary object to provide an utility vehicle capable of avoiding scattering of the water, then sucked by the cooling fan, towards an exhaust pipe on an upstream side of the oxygen sensor.

In order to accomplish the foregoing object, a utility vehicle of the present invention comprises: an air cooled engine; a cooling fan disposed on one side of the engine with respect to a vehicle widthwise direction and configured to supply a cooling air towards a cylinder unit of the engine, the cooling fan being fixed to one end portion of an engine rotary shaft on the one side; an exhaust pipe disposed on the other side of the engine with respect to the vehicle widthwise direction and connected with an exhaust port of the cylinder unit; an oxygen sensor fitted to the exhaust pipe; and a shield configured to prevent mud water, which is swirled by the cooling fan, from depositing on the exhaust pipe. The term "cylinder unit" referred to above and hereinafter is to be understood as including a cylinder portion and a cylinder head portion. Also, the term "muddy water" referred to above and hereinafter is to be understood as including only water.

The "utility vehicle" referred to above and hereinafter is an all-terrain vehicle, which is also called a four wheel buggy, and is capable of running on any type of passage way regardless of such geographical land features as muddy land, sand beach and snowy road. The utility vehicle referred to hereinabove and hereinafter is to be understood as used in various applications such as, for example, leisure and works.

According to the above described construction, thanks to the use of the shield, muddy water discharged from the cooling fan is prevented from scattering to deposit on the exhaust pipe. Since any possible solidification of a water component of the exhaust gases within the exhaust pipe can therefore be avoided, the operation of the oxygen sensor will not be adversely affected.

In the present invention, the shield referred to above may be so disposed as to surround the outer periphery of the exhaust pipe. According to this construction, the muddy water tending to flow towards the exhaust pipe can be effectively shielded. In this case, the shield may be in the form of a plate material and may be jointly fastened to the exhaust port together with the exhaust pipe. According to this construction, there is no need to make use of a mounting portion solely for the shield and, therefore, the structure can be simplified, and also the shield can be easily applied to any existing product. Accordingly, selection of either the use of the shield or the non-use of the shield can be easily appreciated.

In the present invention, the use may be made of a shroud configured to guide the cooling air from the cooling fan towards the cylinder unit and an ignition plug. According to this construction, any possible flow of the muddy water towards the exhaust pipe can be blocked by the shield while the cooling air can be guided through the shroud to a site where it requires.

In present invention, the shield may be provided with a discharge opening through which the cooling air, after having been used to cool the cylinder unit, is discharged to the outside of the engine. According to this construction, the cooling air can be discharged to the outside of the engine while any possible deposit of the muddy water on the exhaust pipe is prevented.

In the present invention, the shield may comprise: a first shielding plate configured to cover an upper half portion of the exhaust pipe; a second shielding plate configured to surround a lower half portion of the exhaust pipe; and a third shielding plate configured to shield a gap delimited between the first and second shielding plates, in which case the first shielding plate is jointly fastened to the exhaust port together with the exhaust pipe, and the second and third shielding plate are jointly fastened to the first shielding plate by a common fastener. According to this construction, the shield can be fitted to the engine with a simplified structure.

In the present invention, the engine referred to above may be disposed between left and right rear wheels. According to this construction, although the muddy water swirled upwardly by the rear wheels may be apt to intrude into the cooling fan, the muddy water can be blocked off by the shield, and therefore, the operation of the oxygen sensor can be secured.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
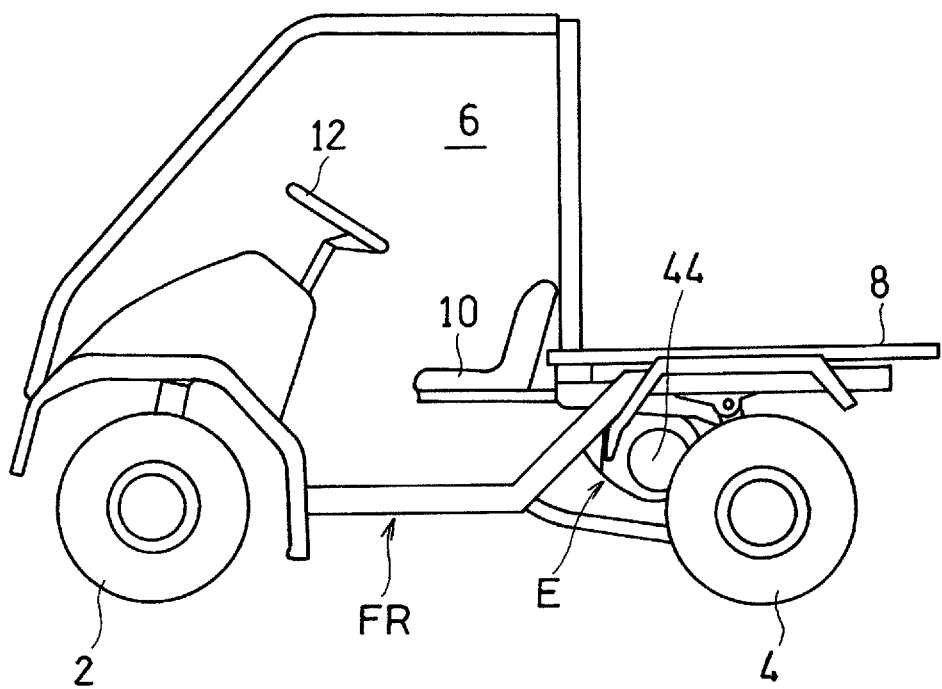
FIG. 1 is a side view showing a utility vehicle according to a first preferred embodiment of the present invention.

Hereinafter, the preferred embodiment of the present invention will be described in detail with particular reference to the accompanying drawings. It is, however, to be noted that in the description of the preferred embodiment of the present invention the terms "left" and "front" that are hereinabove and hereinafter used are to be understood as meaning relative terms descriptive of positions and/or directions as viewed from a vehicle driver occupying the seat. The terms "front and rear" that are used hereinabove and hereinafter are to be understood as relative terms descriptive of positions and/or directions taken with respect to the direction of forward travel of the vehicle. It is also to be noted that FIG. 1 illustrates a side view of a utility vehicle designed in accordance with a first preferred embodiment of the present invention. The term "utility vehicle" referred to above and hereinafter means an all-terrain which is also called a four wheel buggy and which is capable of running on any type of passage way regardless of such geographical land features as muddy land, sand beach and snowy road. The utility vehicle referred to hereinabove and hereinafter is to be understood as used in various applications such as, for example, leisure and works.

The vehicle according to the embodiment now under discussion has a driver's cabin 6 provided between a front wheel 2 and a rear wheel 4 and, also, a loading platform 8 positioned rearwardly of the driver's cabin 6. The driver's cabin 6 is provided with a seat 10 on which a driver sits or a driver and a fellow passenger sit, and also has a steering handle 12 positioned forwardly of the seat 10. Steering of the steering handle 12 performed by the driver results in steering of the front wheel 2. An engine E, which is a drive source, is disposed beneath the loading platform 8 at a location rearwardly of the seat 10. The engine E is supported by a vehicle framework FR.

The utility vehicle in the present embodiment is a four-wheel drive vehicle. In other words, a rotational force of the engine E is transmitted to the rear wheel 4 and the front wheel 2 through a power transmission system (not shown), and the front and rear wheels 2 and 4 are therefore driven. It is, however, to be noted that the utility vehicle of the present invention is not necessarily limited to such four-wheel drive vehicle as described and may be a two-wheel drive vehicle. In such case, the rotational force of the engine E is transmitted to the rear wheel 4 through a power drive system (not shown) to drive the rear wheel 4.

Figure 2:
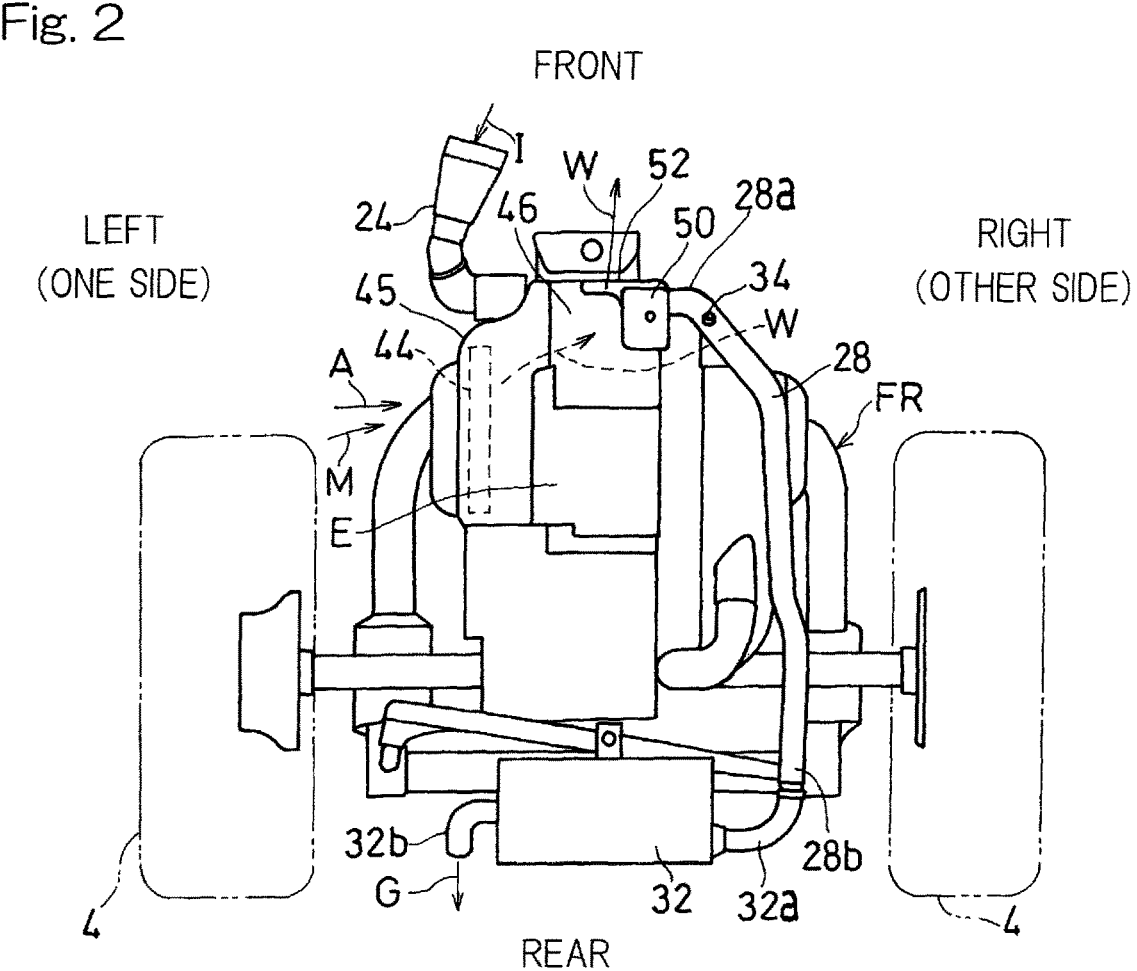
FIG. 2 is a top plan view showing a rear portion of the utility vehicle shown in FIG. 1.
Figure 4:
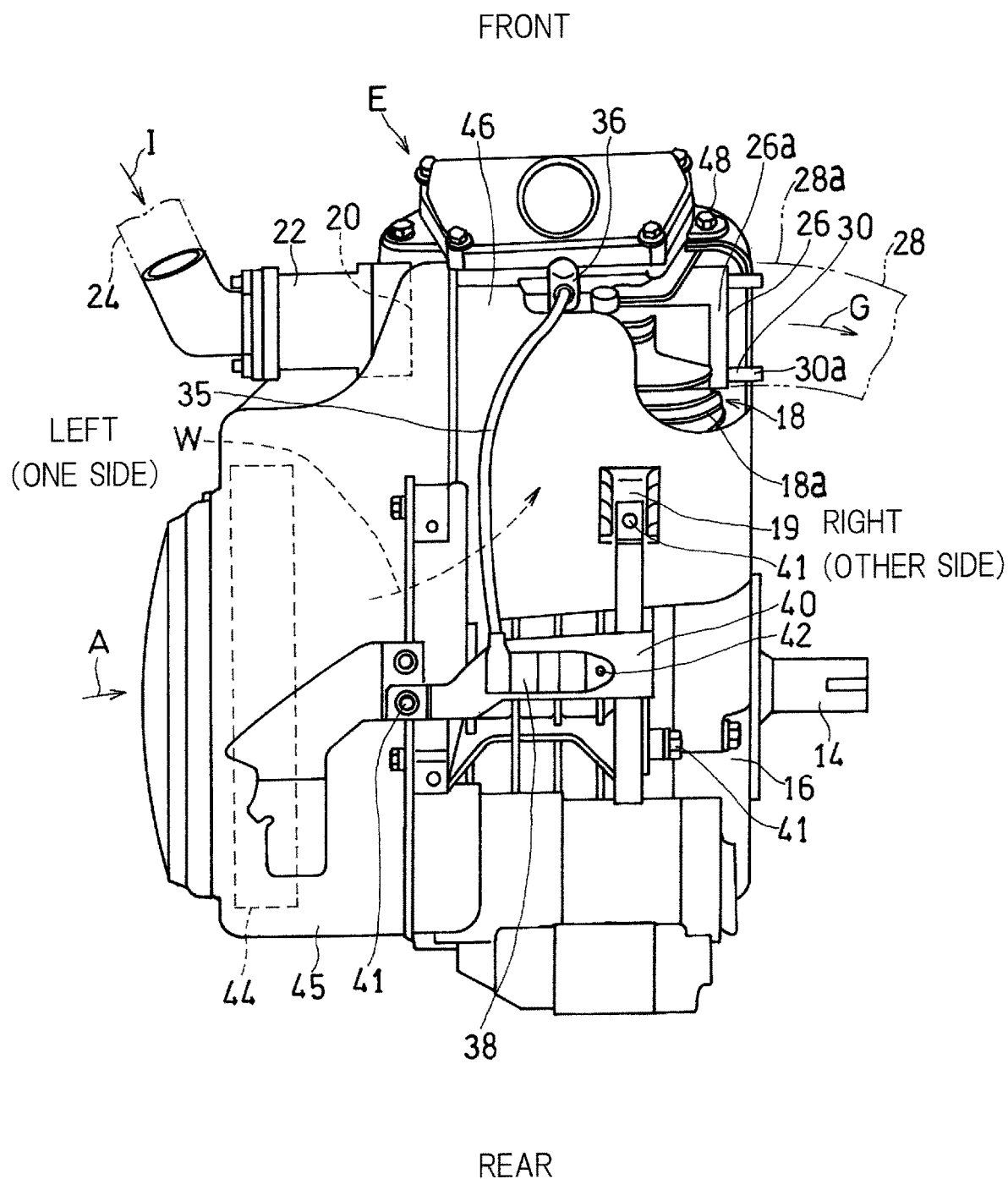
FIG. 4 is a top plan view showing an engine used in the utility vehicle.

As shown in FIG. 2, the engine E is disposed intermediate between the left and right rear wheels 4 and 4. The engine employed in the practice of the present embodiment is a single cylinder engine and includes, as shown in FIG. 4, a crankshaft 14 extending in a vehicle widthwise direction (left and right direction), a crankcase 16 to support the crankshaft 14, and a cylinder unit 18 protruding forwardly from the crankcase 16. It is to be noted that, in FIG. 4, a shield 50 as will be detailed later is not shown.

The crankcase 16 and the cylinder unit 18 are each made of aluminum alloy. It is, however, the material for each of the crankcase 16 and the cylinder unit 18 is not necessarily limited thereto. The term "cylinder unit 18" referred to above and hereinafter is to be understood as including a cylinder portion and a cylinder portion both cooperative to define a combustion chamber, with a valve member for intake and exhaust systems, an ignition plug and others being provided in the cylinder head portion. The cylinder unit 18 has an outer peripheral surface formed with a cooling fin 18a. An upwardly protruding mounting platform 19 is provided on an upper surface of the cylinder unit 18. The mounting platform 19 is formed with an upwardly oriented screw hole (not shown).

A left side surface of the cylinder unit 18, which is one side surface that lies in the vehicle widthwise direction, is formed with an intake port 20. A fuel supply device 22 is fluid connected with the intake port 20. The fuel supply device 22 referred to above is, for example, a carburetor. It is, however, to be noted that the fuel supply device 22 is not necessarily limited to such carburetor as described above. The fuel supply device 22 serves to adjust the amount of air to be supplied to the engine E and also to generate an air-fuel mixture to be supplied to the engine E by injecting fuel into the intake air. The fuel supply device 22 has an inlet to which the intake air I is supplied through an intake tube 24.

A right side surface of the cylinder unit 18, which is the other side surface that lies in the vehicle widthwise direction, is formed with an exhaust port 26. This exhaust port 26 is formed with a collar-shaped flange portion 26a. To this flange portion 26a, a connecting member 30 such as, for example, a stud bolt, is provided so as to protrude outwardly (rightwardly). In the practice of this embodiment now under discussion, the connecting member 30 is employed two in number. In the description that follows, the terms "upstream" and "downstream" are intended to mean upstream and downstream sides, respectively, with respect to the direction of flow of exhaust gases G of and from the engine E.

The exhaust port 26 is fluid connected with an exhaust pipe 28. The exhaust pipe 28 has its upstream end 28a fluid connected with the exhaust port 26. A connecting structure used to connect the exhaust pipe 28 with the exhaust port 28 will be described in detail later. As shown in FIG. 2, the exhaust pipe 28 is, after having been protruded from the right side surface of the cylinder unit 18 in an outward direction (laterally rightwardly), bent 90° so as to extend rearwards along the right side of the engine E.

The exhaust pipe 28 also has a downstream end 28b fluid connected with an inlet tube 32a of a muffler 32. In the practice of the embodiment now under discussion, a plurality of bolts (not shown) are used to connect the exhaust pipe 28 with the muffler 32. Each of the exhaust pipe 28 and the muffler 32 is made of, for example, stainless steel. It is, however, that the material for each of the exhaust pipe 28 and the muffler 32 may not be necessarily limited to that described hereinabove.

The muffler 32 is disposed in a rear end portion of a vehicle body at a location rearwardly of the engine E. This muffler 32 has an expansion chamber (not shown) formed in the interior thereof and serves to silence noises of the exhaust gases G introduced thereinto. The exhaust pipe 28 is fluid connected with a right side wall of the muffler 32 through the inlet tube 32*a* whereas a left side wall of the muffler 32 is fluid connected with an discharge tube 32*b*. Exhaust gases G expanded and silenced within the muffler 32 are discharged to the outside through the discharge tube 32*b*.

Figure 3:
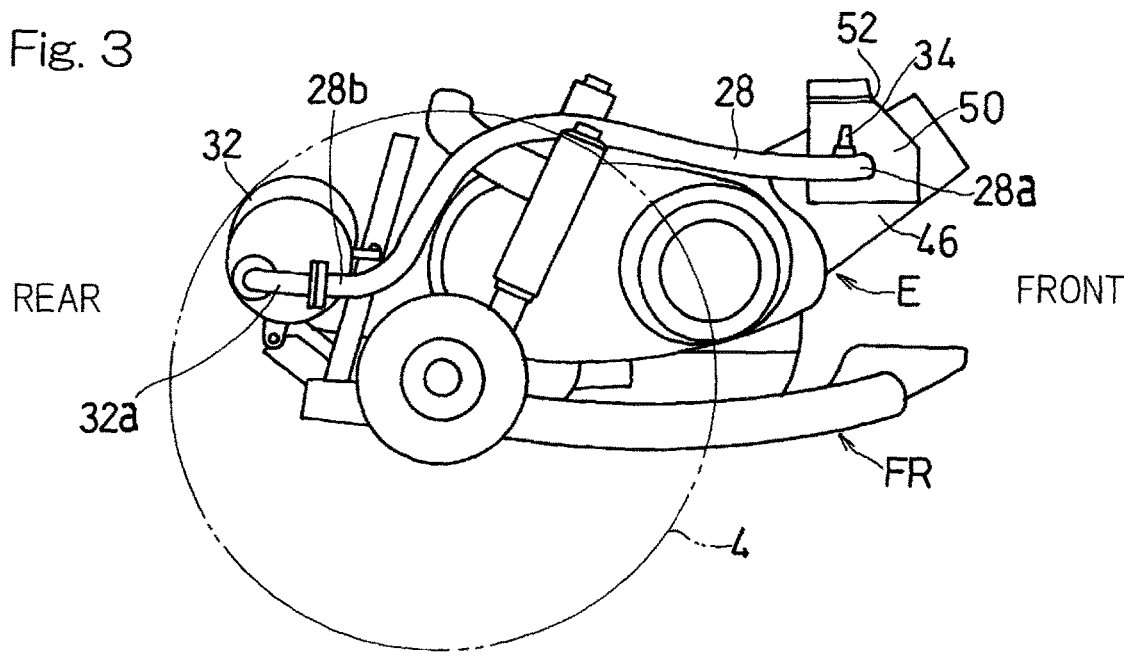
FIG. 3 is a side view showing the rear portion of the utility vehicle shown in FIG. 1.

An oxygen sensor 34 is fitted to the exhaust pipe 28. Specifically, the oxygen sensor 34 is provided in the vicinity of the upstream end 28*a* of the exhaust pipe 28. In other words, the oxygen sensor 34 is disposed in the vicinity of the exhaust port 26 in the cylinder unit 18. This oxygen sensor 34 is used to detect the concentration of oxygen contained in the exhaust gases G. A detecting element of the oxygen sensor 34 employed in the practice of the embodiment now under discussion is ceramic. The oxygen sensor 34 is, as best shown in FIG. 3, fitted to an upper surface of the exhaust pipe 28 so as to protrude upwardly therefrom.

As shown in FIG. 4, an ignition plug 36 is fitted to a tip end portion (front portion) of the cylinder unit 18. This ignition plug 36 serves to carry out spark ignition within the combustion chamber. The ignition plug 36 is electrically connected with an ignition coil 38 through a cable 35. The ignition coil 38 employed in the practice of the embodiment now under discussion is disposed on an upper surface of the crankcase 14.

The ignition coil 38 referred to above is fixed to the engine E through a coil bracket 40. The coil bracket 40 is in turn fitted to the engine E through a plurality of fastening members 41. The ignition coil 38 is in turn fitted to the coil bracket 40 through a screw body 42.

The engine E employed in the practice of the present invention is an air cooled engine. In other words, a cooling fan 44 is disposed on one side (left side) of the engine E in the vehicle widthwise direction of the engine E. This cooling fan 44 supplies a cooling wind or cooling air W to the cylinder unit 18. The cooling fan 44 is fixed to one end portion (right end) of the crankshaft 14. In other words, the cooling fan 44 is driven to rotate together with the crankshaft 14.

The cooling fan 44 is covered by a fan housing 45. The fan housing 45 is removably fitted to one end surface (left side surface) of the engine E by means of bolts (not shown). The cylinder unit 18 has a shroud 46 fitted thereto. Specifically, the shroud 46 is removably fitted to the cylinder unit 18 through a plurality of bolts 48.

The shroud 46 is of a U-shaped configuration opening laterally leftwards. In other words, the shroud 46 covers upper and lower areas of the cylinder unit 18 and, at the same time, covers a portion of a laterally rightward area of the cylinder unit 18, excluding the exhaust port 28. The shroud 46 serves to guide the cooling air W from the cooling fan 44 towards the cylinder unit 18 and also towards the ignition plug 36. That is to say, the cooling air W is swirled by the cooling fan 44 from one side (left side) of the vehicle widthwise direction and is then guided by the shroud 46 towards the other side (right side) of the vehicle widthwise direction and forwardly.

The shield 50 is provided in the vicinity of the exhaust port 28 in the cylinder unit 18 as best shown in FIG. 3. In the practice of the embodiment now under discussion, the shield 50 is disposed so as to surround the periphery of the exhaust pipe 28. When the vehicle runs on a muddy land, it may occur that the muddy water M may be swirled by the cooling fan 44 together with outside air A. The shield 50 serves to avoid deposit of such muddy water M onto the outer peripheral surface of the exhaust pipe 28. The term "muddy water" hereinabove and hereinafter used is to be understood as including only water.

Figure 5:
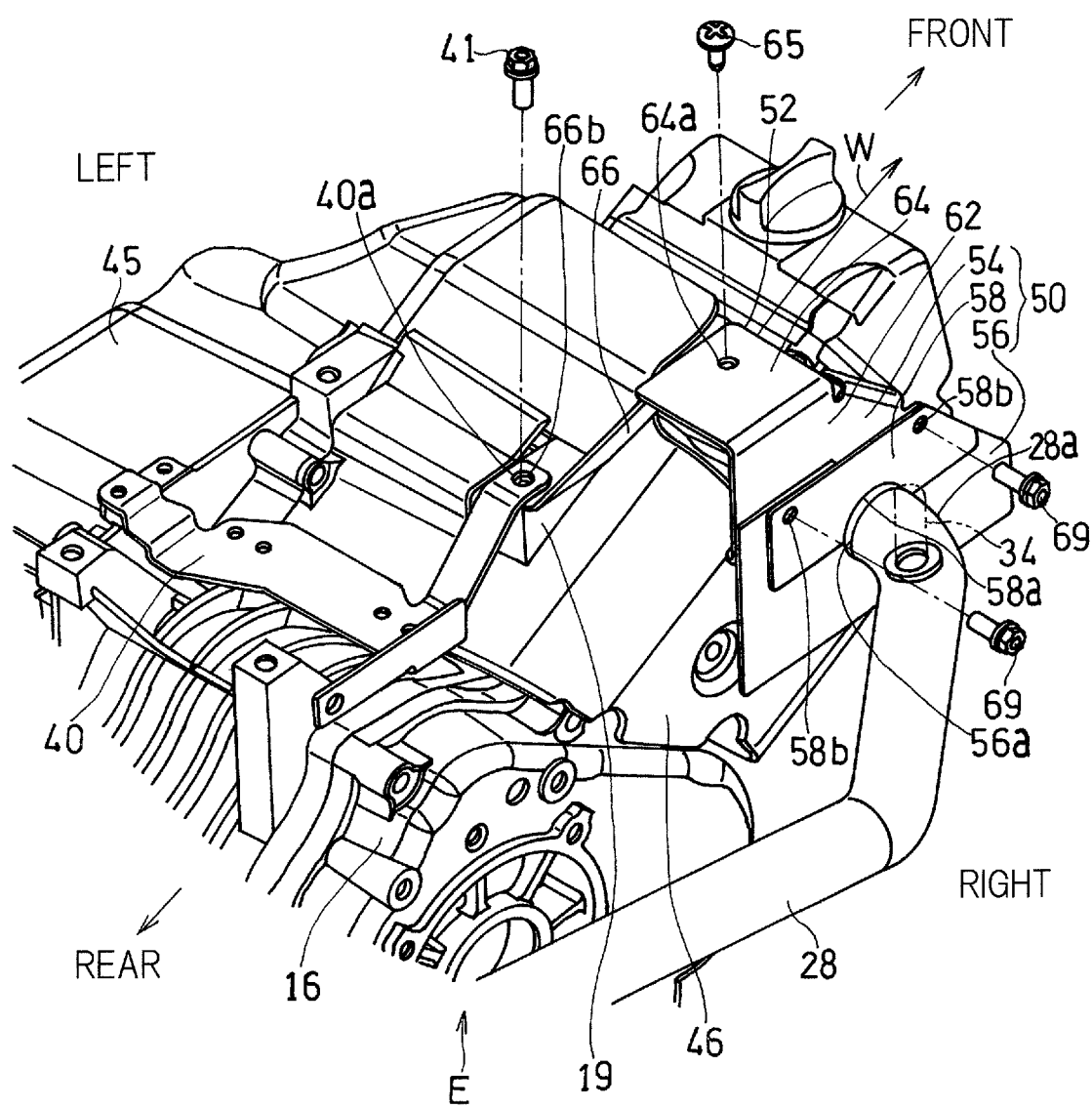
FIG. 5 is a perspective view showing an important portion of the engine.

The shield 50 serves to avoid flow of the muddy water M (cooling air W) towards the other side of the vehicle widthwise direction, that is, towards the exhaust pipe 28 and, at the same time, guide the cooling air W in a forward direction. In other words, the shield 50 is provided with a discharge opening 52 for discharging the cooling air W, which has been used to cool the cylinder unit 18, to the outside of the engine E. As shown in FIG. 5, the discharge opening 52 is formed between an outer edge of the shield 50 and the shroud 46. The discharge opening 52 discharges the cooling air W in a forward direction.

Figure 6:
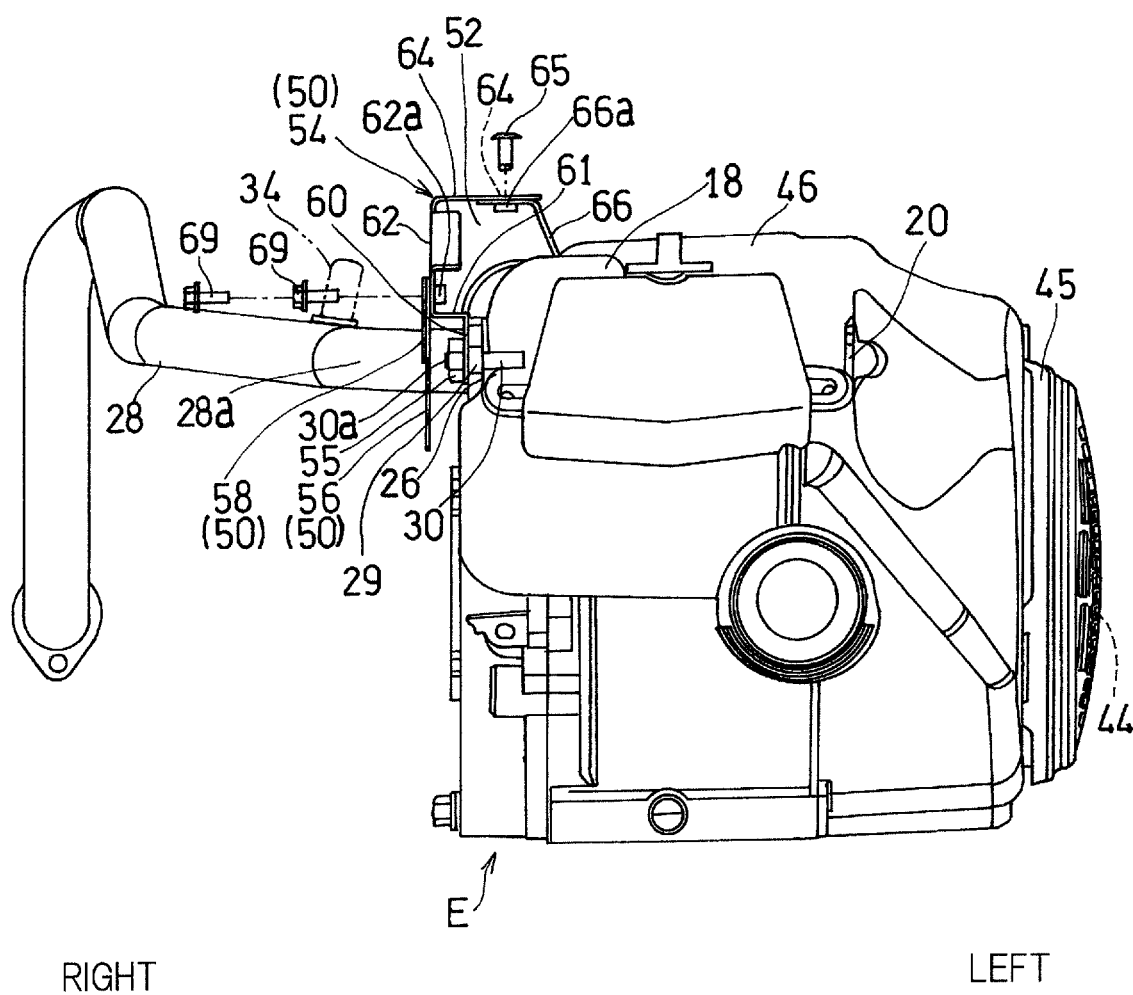
FIG. 6 is a front elevational view showing the engine as viewed from front of the vehicle.

The shield 50 employed in the practice of this embodiment now under discussion is in the form of a metallic plate and is fitted to the exhaust port 26 by means of fastening members 55 (shown in FIG. 6). In other words, the shield 50 employed in the practice of this embodiment now under discussion is provided as a member separate from the cylinder unit 18 and the shroud 46 and is removably fitted to the engine E. The manner by which the shield 50 is fitted to the engine E will be described in detail later. It is, however, to be noted that the shield 50 may be formed integrally with the shroud 46 or the cylinder unit 16 so that the shield 50 will not be separable from the shroud 46 or the cylinder unit 18.

More specifically, as shown in FIG. 5, the shield 50 includes a first shielding plate 54 configured to cover an upper half portion of the upstream end 28*a* of the exhaust pipe 28, a second shielding plate 56 configured to surround a lower half portion of the upstream end 28*a* of the exhaust pipe 28, and a third shielding plate 50 configured to close or shield a gap delimited between the first and second shielding plates 54 and 56.

Figure 7:
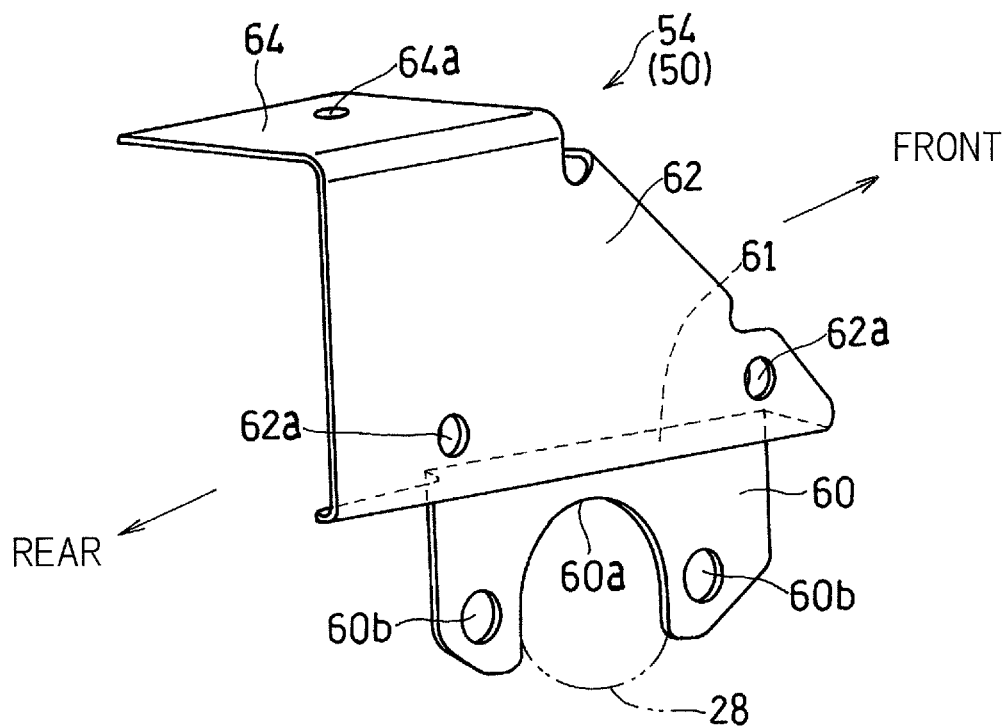
FIG. 7 is a perspective view showing a first shielding plate of a shield for the engine.

The first shielding plate 54 is formed by bending a sheet metal and includes, as shown in FIG. 7, a first mounting portion 60 and a first shielding portion 62 thereabove. The first mounting portion 60 has a plane oriented in the vehicle widthwise direction and is formed with a first arcuate cutout portion 60*a* in which the upper half portion of the exhaust pipe 28 is engaged. First insertion holes 60*b* and 60*b*, both oriented in the vehicle widthwise direction, are formed in respective areas of the first mounting portion 60 that are situated on opposite sides (front and rear sides) of the first arcuate cutout portion 60*a*.

The first mounting portion 60 has its upper end bent outwardly in the vehicle widthwise direction to define a connecting portion 61. The connecting portion 61 serves to cover the exhaust pipe 28 from above. The connecting portion 61 is bend upwardly to define the first shielding portion 62. In other words, the connecting portion 61 connects the first mounting portion 60 and the first shielding portion 62 together.

The first shielding portion 62 serves to block the muddy water M, which is swirled about by the cooling fan 44, from flowing in a direction towards the other side (right side) of the vehicle widthwise direction. The first shielding portion 62 has a plane oriented in the vehicle widthwise direction and is, in the embodiment now under discussion, so shaped, when viewed from side, as to represent a trapezoidal shape having a long base. A first screw hole 62*a* oriented in the vehicle widthwise direction is formed in a lower portion of the first shielding portion 62. The first screw hole 62*a* employed in the practice of the preferred embodiment now under discussion is in the form of a welded nut and is employed two in number that are juxtaposed side by side in the vehicle front and rear direction. It is, however, to be noted that the first screw hole 62*a* is not necessarily limited to the welded nut such as described above and the number of the first screw hole 62*a* employed is not also necessarily limited to two such as described above.

Figure 8:
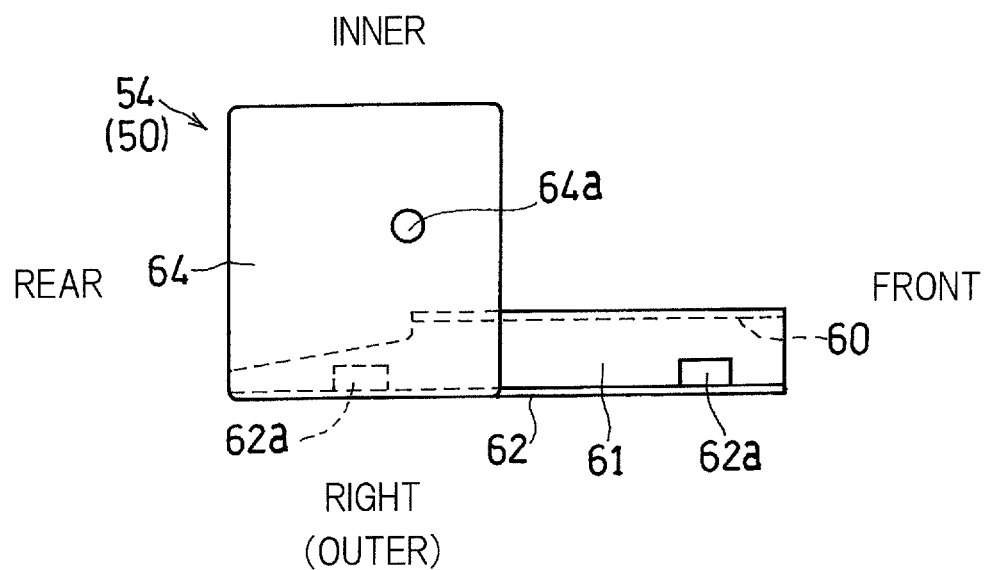
FIG. 8 is a top plan view showing the first shielding plate as viewed from top of the vehicle.

The first shielding portion 62 has its upper end bent, as shown in FIG. 6, inwardly of the vehicle widthwise direction to define a second mounting portion 64. As shown in FIG. 8, the second mounting portion 64 has a plane oriented in an up and down direction or vertical direction and is, in the embodiment now under discussion, so shaped, when viewed from top, as to represent a rectangular shape. A second insertion hoe 64*a*, which is oriented in the vertical direction is formed in the second mounting portion 64. In the practice of the embodiment now under discussion, the number of the second insertion hole 64*a* employed is one, but the number of the second insertion hole 64*a* may not be necessarily limited to one such as shown and described. It is, however, to be noted that the second mounting portion 64 may not be necessarily employed.

Figure 9:
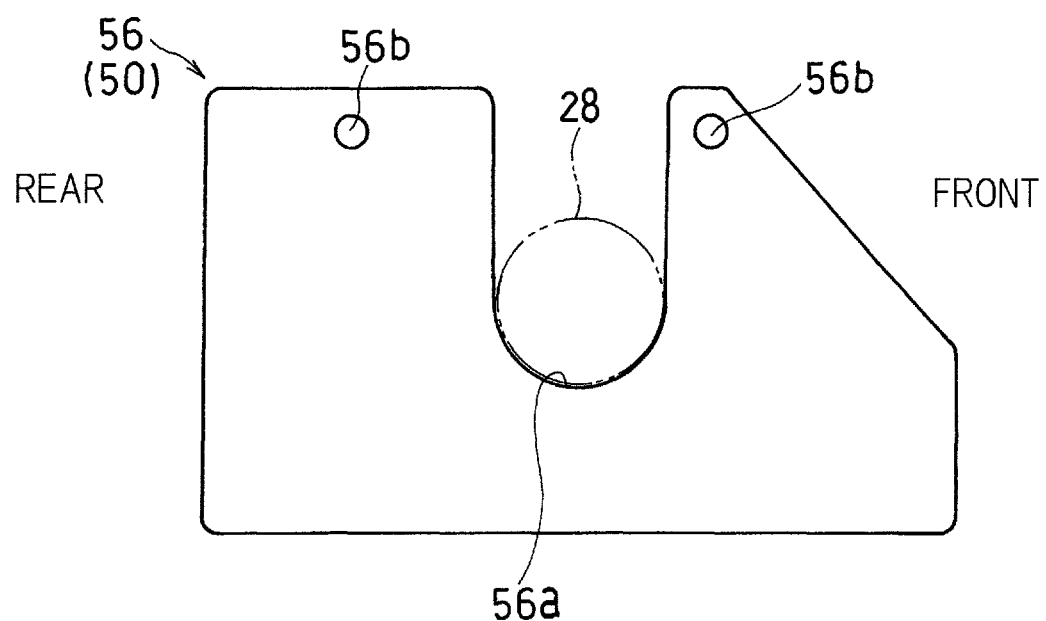
FIG. 9 is a side view showing a second shielding plate of the shield as viewed from lateral side of the vehicle.

As shown in FIG. 9, the second shielding plate 56 is formed by bending a sheet metal and has a plane oriented in the vehicle widthwise direction. The second shielding plate 56 is formed with a second arcuate cutout portion 56*a* in which the lower half portion of the exhaust pipe 28 is engaged. With the second cutout portion 56*a* engaged in the lower half portion of the exhaust pipe 28, the second shielding plate 56 encloses the lower half portion of the exhaust pipe 28. Accordingly, the second shielding plate 56 blocks the muddy water M, which is swirled by the cooling fan 44 (FIG. 4), from flowing in a direction towards the other side of the vehicle widthwise direction. The second shielding plate 56 has its upper end portion formed with a third insertion hole 56*b* that is oriented in the vehicle widthwise direction. The third insertion hole 56*b* is employed two in number that are juxtaposed side by side in the vehicle front and rear direction. Each of those third insertion holes 56*b* is defined in the second shielding plate 56 at a respective position aligned with the first screw hole 62*a* (FIG. 7) in the first shielding plate 54.

Figure 10:
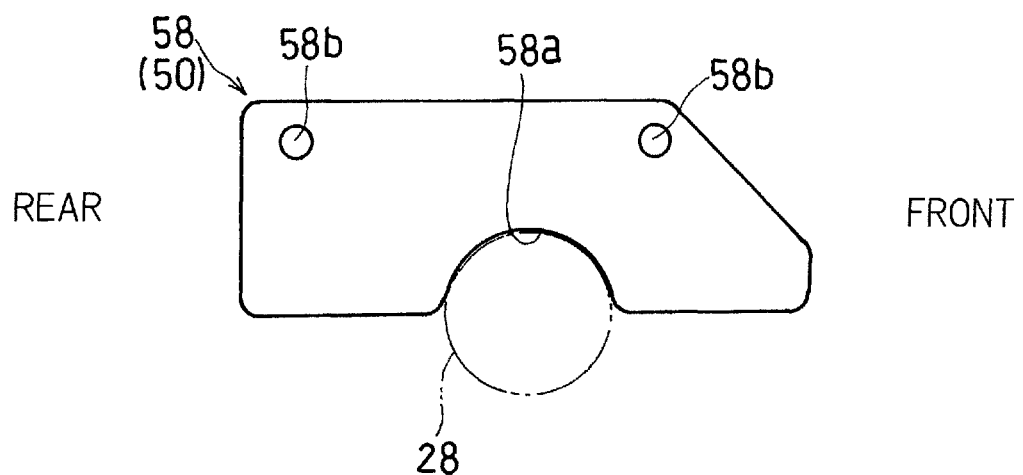
FIG. 10 is a side view showing a third shielding plate of the shield as viewed from lateral side of the vehicle.

As shown in FIG. 10, the third shielding plate 58 is prepared from a sheet metal and has a plane oriented in the vehicle widthwise direction. The third shielding plate 58 is formed with a third arcuate cutout portion 58*a* that is engaged with an upper portion of the exhaust pipe 28. The third shielding plate 58 has an upper end portion formed with a fourth insertion hole 58*b* oriented in the vehicle widthwise direction. The fourth insertion hole 58*b* is provided two in number in a fashion juxtaposed side by side in the vehicle front and rear direction. Each of the fourth insertion holes 58*b* is defined at a respective position aligned with the first screw hole 62*a* (FIG. 7) in the first shielding plate 54 and also with the third insertion hole 56*b* in the second shielding plate 56.

Hereinafter, the details of the mounting structure of the shield 50 will be described. The first shielding plate 54 is jointly fastened to the exhaust port 26 together with the exhaust pipe 28. Specifically, a collar-shaped flange 29 is formed in the upstream end 28*a* of the exhaust pipe 28. Into an insertion hole (not shown) formed in the flange 29, the connecting member 30 of the exhaust port 26 is inserted. Also, the connecting member 30 of the exhaust port 26 is to inserted into the first insertion hole 60*b* in the first shielding plate 54. In this condition, a nut 55, which is a sort of the fastening member, is threadingly engaged with a male screw portion 30*a* of the connecting member 30. Accordingly, the first shielding plate 54 is jointly fastened to the exhaust port 26 together with the exhaust pipe 28.

Again, the first shielding plate 54 is supported by the cylinder unit 18 through a shield bracket 66. Specifically the shield bracket 66 is in the form of an elongated plate member extending diagonally upwardly from a lower end portion thereof, which is to be fitted to the cylinder unit 18, to an upper end portion for supporting the second mounting portion 64. The shield bracket 66 has its upper end portion formed with a second screw hole 66*a* that is oriented in the vertical direction. As shown in FIG. 5, the shield bracket 66 has its lower end portion formed with an insertion hole 66*b* that is oriented in the vertical direction. A fastening member 41 such as, for example, a bolt is inserted from above into the insertion hole 40*a* of the coil bracket 40 and is then threaded into the screw hole 66*a* of the shield bracket 66, thereby allowing the shield bracket 66 to be fitted to the cylinder unit 18 of the engine E together with the coil bracket 40.

Furthermore, a screw body 65 is inserted from above into the second insertion hole 64*a* in the first shielding plate 54 and is then threaded into the second screw hole 66*a* in the shield bracket 66 as shown in FIG. 5. Accordingly, the first shielding plate 54 is fitted to the cylinder unit 18 through the shield bracket 66.

Thereafter, as shown in FIG. 5, the lower half portion of the exhaust pipe 28 is engaged in the second cutout portion 56*a* of the second shielding plate 56, and then, the upper portion of the exhaust pipe 28 is engaged in the third cutout portion 58*a* of the third shielding plate 58. In this condition, from the outside of the vehicle widthwise direction (right side), a bolt 69 is inserted into the fourth insertion hole 58*b* in the third shielding plate 58 and then into the third insertion hole 56*b* in the second shielding plate 56. The bolt 69 so inserted is threaded into the first screw hole 62*a* (the welded nut shown in FIG. 7) in the first shielding plate 54. By so doing, the second and third shielding plates 56 and 58 are jointly fastened to the first shielding plate 54. Accordingly, the shield 50 is removably fitted to the engine E.

In the description that follows, the flow of the cooling air in the vehicle designed according to the embodiment now under discussion will be discussed. When the engine is started, the cooling fan 44 shown in FIG. 2 is driven and outside air A is then introduced as a cooling air W from one side (left side) of the vehicle widthwise direction. The cooling air W so introduced by the cooling fan 44 is guided by the fan housing 45 and is subsequently introduced into the cylinder unit 18. The cooling air W so introduced into the cylinder unit 18 is guided by the shroud 46 so as to flow among the cooling fins 18*a* (FIG. 4) in the cylinder unit 18. The cooling air W, which has cooled the cylinder unit 18, is discharged from the discharge opening 52 to the outside of the engine E.

It may occur that, when the vehicle runs, the muddy water M swirled about by the rear wheel 4 may intrude into the cooling fan 44 since the engine E is disposed intermediate between the left and right rear wheels 4 and 4. The muddy water M so intruding the cooling fan 44 flows towards the other side (right side) of the vehicle widthwise direction together with the cooling air W, but the muddy water M is blocked by the shield 50 to prevent the muddy water M from scattering towards the exhaust pipe 28. Accordingly, since the possibility of a water component of the exhaust gases within the interior of the exhaust pipe 28 to become a solidified water can be avoided, there is no possibility that the muddy water M may collide against an element of the oxygen sensor 34. Therefore, the operation of the oxygen sensor 34 will not be adversely affected.

In the construction hereinabove described, the possibility of the muddy water M flowing to the exhaust pipe 28 can be blocked while the cooling air W can be guided by the shroud 46 towards a site that requires the cooling air W. Also, since the discharge opening 52 for the cooling air W is defined by the outer edge of the shroud 46 and the shield 50, the flow of the cooling air W is rendered to be smooth and, hence, a sufficient cooling effect can be obtained. As discussed above, in the practice of the embodiment discussed hereinabove, cooperation of the shroud 46 with the shield 50 is effective to prevent the muddy water M from depositing on the exhaust pipe 28 to thereby avoid inconveniences which may occur in the oxygen sensor 34 and, hence, the cylinder unit 18 can be efficiently cooled.

As shown in FIG. 3, the shield 50 is so disposed as to surround the outer periphery of the exhaust pipe 28. Accordingly, the flow of the muddy water M towards the exhaust pipe 28 can be effectively shielded. Also, the shield 50 is jointly fastened to the exhaust port 26 together with the exhaust pipe 28. Accordingly, there is no need to provide the engine E with any mounting portion dedicated solely to the shield and, hence, the structure can be simplified, and also, the shield 50 can be easily applied to any existing product. Therefore, selection of either the use of the shield 50 or the non-use of the shield 50 can be easily appreciated.

As shown in FIG. 5, the shield 50 includes the first shielding plate 54 configured to cover the upper half portion of the exhaust pipe 28, the second shielding plate 56 configured to surround the lower half portion of the exhaust pipe 28, and the third shielding plate 58 configured to close the gap delimited between the first and second shielding plates 54 and 56. The first shielding plate 54 is jointly fastened to the exhaust port 26 together with the exhaust pipe 28 and the second and third shielding plates 56 and 58 are jointly fastened to the first shielding plate 54 by the common bolts 69. Hence, with a simplified structure, the shield 50 can be removably fitted to the engine E.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, although in describing the present invention in detail reference has been made by way of an example of a single cylinder combustion engine as a drive source, the present invention can be equally applicable to a multi-cylinder combustion engine.

Accordingly, such changes and modifications are, unless they depart from the scope of the present invention as delivered from the claims annexed hereto, to be construed as included therein.

REFERENCE NUMERALS

4 . . . Rear wheel
18 . . . Cylinder unit
26 . . . Exhaust port
28 . . . Exhaust pipe
34 . . . Oxygen sensor
36 . . . Ignition plug
44 . . . Cooling fan
46 . . . Shroud
50 . . . Shield
52 . . . Discharge opening
54 . . . First shielding plate
56 . . . Second shielding plate
58 . . . Third shielding plate
E . . . Engine
M . . . Muddy water
W . . . Cooling air

What is claimed is:

1. A utility vehicle which comprises:
an air cooled engine;
a cooling fan disposed on one side of the engine with respect to a vehicle widthwise direction and configured to supply a cooling air towards a cylinder unit of the engine;
the cooling fan being fixed to one end portion of an engine rotary shaft on the one side;
a shroud configured to guide the cooling air from the cooling fan towards the cylinder unit;
an exhaust pipe disposed on the other side of the engine with respect to the vehicle widthwise direction and connected with an exhaust port of the cylinder unit;
an oxygen sensor fitted to the exhaust pipe; and
a shield configured to prevent mud water, which is swirled by the cooling fan, from depositing on the exhaust pipe, wherein the shield and the shroud define a discharge opening that discharges the cooling air in a forward direction of the utility vehicle.

2. The utility vehicle as claimed in claim 1, wherein the shield is so disposed as to surround the outer periphery of the exhaust pipe.

3. The utility vehicle as claimed in claim 2, wherein the shield is in the form of a plate material and is jointly fastened to the exhaust port together with the exhaust pipe.

4. The utility vehicle as claimed in claim 1, wherein the cooling air, after having been used to cool the cylinder unit, is discharged outside of the engine and in the forward direction of the utility vehicle via the discharge opening.

5. The utility vehicle as claimed in claim 1, wherein:
the shield comprises a first shielding plate configured to cover an upper half portion of the exhaust pipe, a second shielding plate configured to surround a lower half portion of the exhaust pipe, and a third shielding plate configured to shield a gap delimited between the first and second shielding plates;
the first shielding plate is jointly fastened to the exhaust port together with the exhaust pipe; and
the second and third shielding plates are jointly fastened to the first shielding plate by a common fastener.

6. The utility vehicle as claimed in claim 1, wherein the engine is disposed between left and right rear wheels.

7. The utility vehicle as claimed in claim 1, wherein the shield includes a first shielding plate that has a first mounting portion and a first shielding portion, wherein the first mounting portion has a plane oriented in the vehicle widthwise direction and is formed with a cutout portion in which the exhaust pipe is engaged.

8. The utility vehicle as claimed in claim 7, wherein the first shielding portion has an upper end bent inwardly of the vehicle widthwise direction.

9. The utility vehicle as claimed in claim 1, wherein an outer edge of the shield and the shroud form the discharge opening in between.

* * * * *